United States Patent [19]

Morita

[11] Patent Number: 4,692,568

[45] Date of Patent: Sep. 8, 1987

[54] DIGITIZER USING PHASE INVERSION DETECTION SYSTEM

[75] Inventor: Yoshiyuki Morita, Tokyo, Japan

[73] Assignee: Seiko Instruments & Electronics Ltd., Tokyo, Japan

[21] Appl. No.: 865,075

[22] Filed: May 19, 1986

[30] Foreign Application Priority Data

May 17, 1985 [JP] Japan ................................ 60-105399

[51] Int. Cl.⁴ ............................................ G08C 21/00
[52] U.S. Cl. ..................................................... 178/19
[58] Field of Search ..................................... 178/18, 19

[56] References Cited

U.S. PATENT DOCUMENTS 4,368,352  1/1983  Davis .................................... 178/19

Primary Examiner—Stafford D. Schreyer

Attorney, Agent, or Firm—Bruce L. Adams; Van C. Wilks

[57] ABSTRACT

In an electromagnetic induction type digitizer having a winding coil for generating magnetic field, a tablet having a plurality of conductive lines, a scanning circuit for detecting phase inversion of an induction signal induced on the conductive lines and counting means for counting the winding coil, the signal process circuit consists of an amplification circuit for amplifying the induction signal, a low pass filter for generating an envelope signal and a comparator for generating a load signal and the scanning circuit includes a decoder for controlling an analogue switch whereby a phase detector is eliminated and the signal process circuit becomes simple as compared with conventional signal process circuit.

3 Claims, 9 Drawing Figures

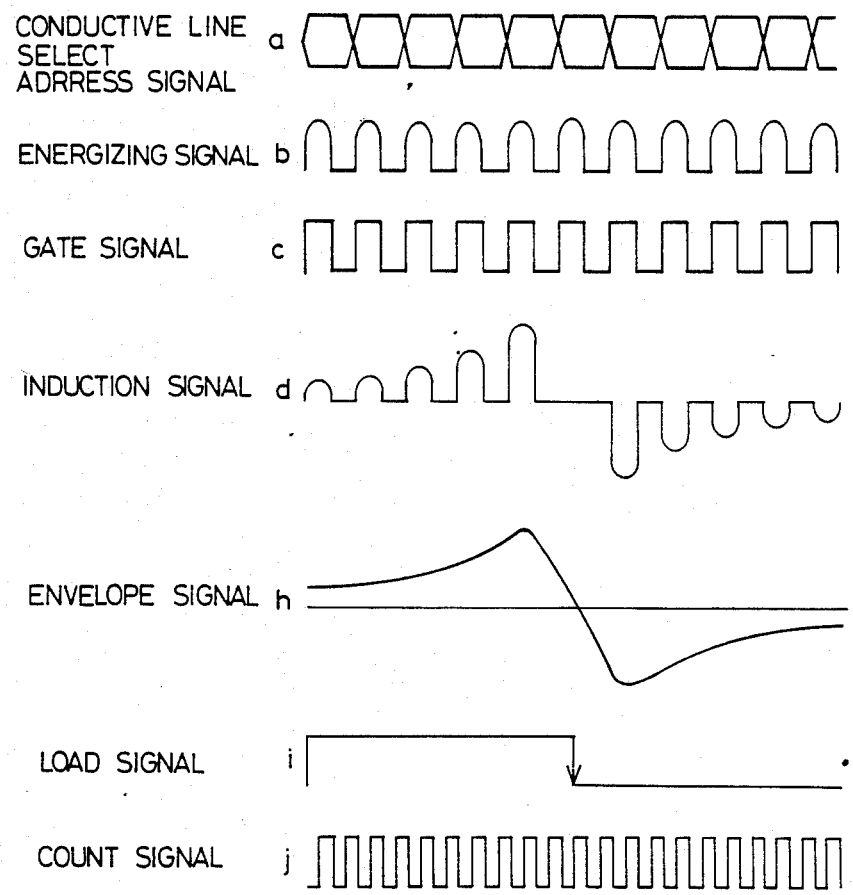

DIGITIZER USING PHASE INVERSION DETECTION SYSTEM

BACKGROUND OF THE INVENTION (a) Field of the Invention

This invention relates to a digitizer serving as an input device of digital unit such as computer and more particularly to an electromagnetic induction type digitizer using phase inversion detection system.

(b) Description of the Prior Art

Conventionally, this kind of digitizer is disclosed in U.S. Pat. Nos. 4,368,351 to Zimmer and 4,206,314 to Prugh et al.

Hereinafter, the conventional digitizer will be explained together with the drawings.

FIG. 4, FIG. 5 and FIG. 6 are conventional digitizers respectively and FIG. 7 is a timing diagram showing the operation waveform of each section.

FIG. 8 is an explanatory diagram showing the relationship between a signal induced on conductive lines and a position of a winding coil.

In FIG. 4, the reference numeral 1 is a tablet serving as a write-in plane plate for the position of the winding coil on which X-conductive lines and Y-conductive lines are arranged.

The conductive line $X_i$ is arranged in parallel to the conductive line $Y_j$ and the distance between the conductive line $X_i$ and conductive line $Y_j$ is 6.4 mm.

One end of the conductive lines $X_i$ and $Y_j$ is grounded commonly, and the other end of the conductive line $X_i$ is connected to the X-scanning circuit 102 and the other end of the conductive line $X_j$ is connected to the Y-scanning circuit 103.

The X-scanning circuit 102 and the Y-scanning circuit 103 are analogue switching means which are composed of such as analogue switch, and select one of the X-conductive lines and one of the Y-conductive lines respectively in response to a conductive line select address signal and further are connected to the input of the process circuit 110.

The reference numeral 4 is multi-stage binary counter which counts signals from an oscillator 5.

Certain bits of the count value functions as the conductive line select address signal a inputted to the X-scanning circuit 102 and the Y-scanning circuit 103.

In the construction of FIG. 4, bit signal a adjacent to the conductive line select address signal is used to change the X-scanning circuit 102 into the Y-scanning circuit 103 alternately, that is, the operation for selecting X-conductive line $X_i$ in turn and the operation for selecting Y-conductive line $Y_j$ are conducted alternately.

The following description will be made without distinguishing X-coordinate from Y-coordinate since the process for solving the value of X-coordinate is the same as that of Y-coordinate.

The bit signal $a_2$ lower than the conductive line select address signal is provided to an energizing circuit 6 to energize the winding coil 7, and the signal process circuit 110 as a reference signal f in order to make phase detection in the induction signal e from the scanning circuit.

The winding coil 7 is energized by the energized signal b in response to this signal $a_2$ and produces magnetic field so that the induction signal e is produced on the conductive line with electro-magnetic coupling.

Moreover, the lower bit $a_3$ including the signal $a_2$ of the count value of the count 4 is used to measure the position of the winding coil between the conductive lines and the detailed explanation of it will be described later.

The signal process circuit 110 is connected to the scanning circuit which receives the induction signal e induced on the conductive line.

The signal process circuit 110 includes an amplification circuit 11, a phase detector 12, a low pass filter 13 and a comparator 14.

Although the detailed explanation will be made later, a load signal i is outputted at a time when the position of the winding coil 7 above the tablet is detected.

The coordinate register 8 is loaded with the count signal j of the counter 4 in response to the load signal i so that the coordinate register 8 holds the count signal as the coordinate value. Next, the operation of the digitizer constructed as the above will be described with reference to FIGS. 5–8 and particularly by the timing diagram of FIG. 7.

The conductive line select address signal a is applied to the scanning circuit every certain period as shown in FIG. 7 and the energizing signal b of half period of the conductive line select address signal is applied to the winding coil 7 so that the induction signal e induced on each conductive line is inputted to the signal process circuit 110 in turn.

Compared the energizing signal b with the induction signal e, these signals are coincident of each other in the phase in the section between A and B and are in inversion phase to each other in the section between B and C.

As shown in FIG. 8, this is because the direction of the induction current is in the inverse state since the rotational direction of the magnetic field produced by the current I flowing into the winding coil, in the right side of the center O of the winding coil is opposite to that in the left side of the center O of the winding coil.

In FIG. 8, the center O of the winding coil is on one conductive line $S_K$ but the induction signal is not produced on the conductive line $S_K$.

The induction signal e is inputted to the phase detector 12 after it is amplified to desired amplitude by the amplification circuit 11 of the signal process circuit.

The phase detector 12 has two input terminals, and it outputs a positive polarity signal when one input signal is the same polarity as the other, whereas it outputs a negative polarity signal when one input signal is opposite to the other in the polarity.

This circuit in U.S. Pat. No. 4,368,351 is embodied by the analogue multiplier of FIG. 5 and that in U.S. Pat. No. 4,206,314 is embodied by the sample hold circuit of FIG. 6.

The timing diagram of FIG. 7 corresponds to the analogue multiplier of FIG. 5 in which the induction signal e is multiplied by the reference signal f equal to the energized signal in view of phase.

The phase detection signal g is applied to the low pass filter connected to the low pass filter 13 which produces an envelope signal h forming an envelope line.

This digitizer adopts coordinate detection principal in which the induction signal induced on the conductive line at one side of the winding coil is opposite to that at the other side of the winding coil in view of phase.

In accordance with the principle, when the conductive line is selected in turn, the phase of the induction signal is watched and the conductive line on which the phase inversion occurs is detected, it may be found that the winding coil is disposed between the conductive line and one before the conductive line.

Moreover, this principle is used to detect not only a conductive line adjacent to the winding coil but also solve the detailed position of the winding coil between the conductive lines.

As shown in FIG. 7, the signals p, q and r in the neighbourhood of the conductive line on which the phase inversion occurs are brought amplitude change dependent on the position of the winding coil so that the polarity inversion point of the envelope signal h changes dependent on the amplitude change.

The time when the polarity of the envelope signal inverts represents the position of the winding coil.

The comparator 14 which receives the envelope signal h, produces the load signal i inverting its polarity at a time when the envelope signal passes "0".

From the above principle, the coordinate of the winding coil is solved by measuring time taken from a count starting point A (which is a scan starting point, coordinate "0" point) to a point B where the load signal i is produced.

Although the count value of the counter 4 is used to measure this time, the count value is used to count the conductive line.

In the example of FIG. 7, the space between two conductive lines is divided into four by the count signal j because it has ¼ period of the conductive line select address signal.

This fact means that the coordinate is possible to solve every 1.6 mm, if the conductive lines are arranged in the distance of 6.4 mm between two conductive lines.

It is apparent that the count signal of shorter period is used in the case of solving a detailed position of the winding coil.

As mentioned above, this digitizer needs to extract the signal component holding the phase relations of the induction signal induced on the conduction lines, relative to the winding coil.

To realize this, the prior art technology has used the analogue multiplication and sample hold circuit as mentioned above.

However, these circuits are relatively complicated and expensive so that the circuits make it impossible for the digitizer to lower its cost.

Particularly, this digitizer using phase inversion detection system is possible to realize with the small size circuit construction and it has been desired to omit or simplify a phase detector since the signal process circuit makes it possible for amplification circuit, filter and comparator to be constructed with the common circuits.

SUMMARY OF THE INVENTION

It is, therefore, an object of this invention to provide a digitizer eliminating a phase detector and adopting a scanning circuit having gate function which the digitizer makes ON-OFF with the gate signal in synchronism with the energizing signal.

It is another object of this invention to provide a digitizer using phase inversion detection system which comprises a winding coil for generating magnetic field to indicate coordinate in response to an energizing signal, a tablet having a plurality of conductive lines arranged in parallel with each other, detection means for detecting phase inversion of an induction signal induced on the conductive lines, counting means for measuring time interval between a starting time of selecting one of the conductive lines and a detecting time of phase inversion, a scanning circuit for selecting one of the conductive lines in turn, the scanning circuit receiving a gate signal from the counting means at an input terminal thereof in synchronism with the energizing signal and including circuit means for selecting the one of conductive lines during existence of the gate signal, and coordinate storing means for holding coordinate value.

BRIEF DESCRIPTION OF THE DRAWINGS

FIG. 3 is a timing diagram of the digitizer according to this invention.

PREFERRED EMBODIMENT OF THE INVENTION

One embodiment of the digitizer according to this invention will be described in conjunction with the drawings hereinafter.

Figure 1:
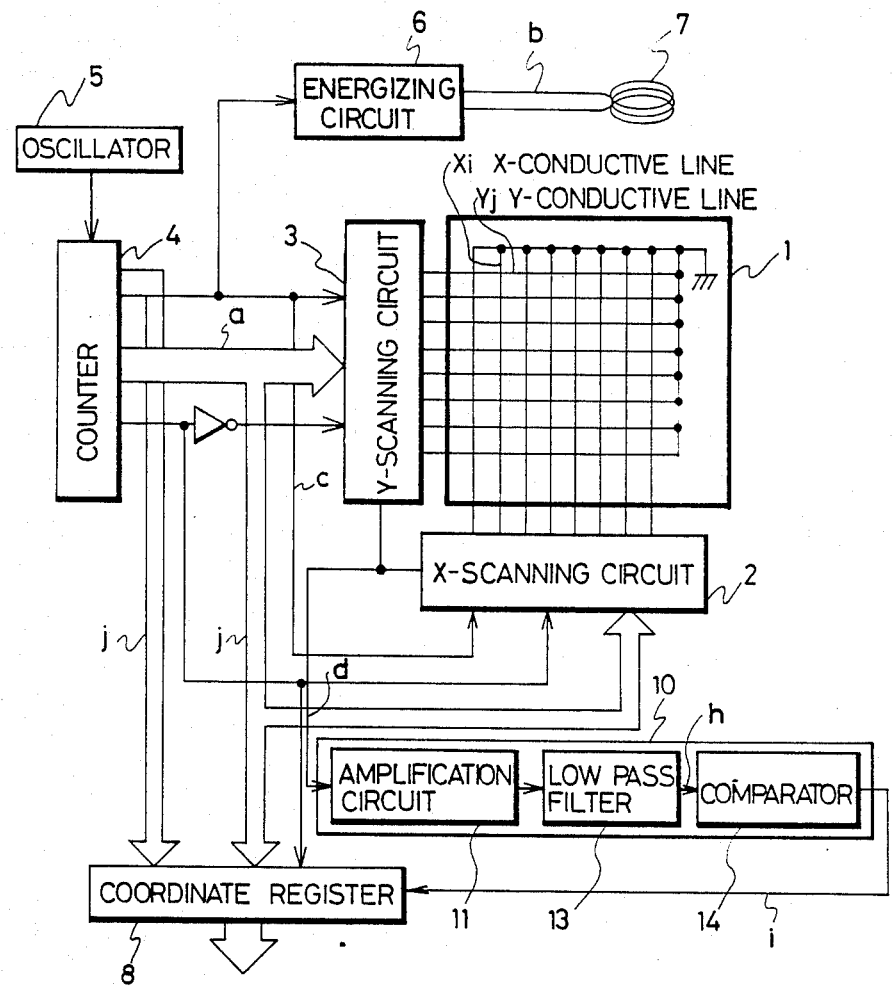
FIG. 1 is a block diagram of a digitizer according to this invention.
Figure 2A:
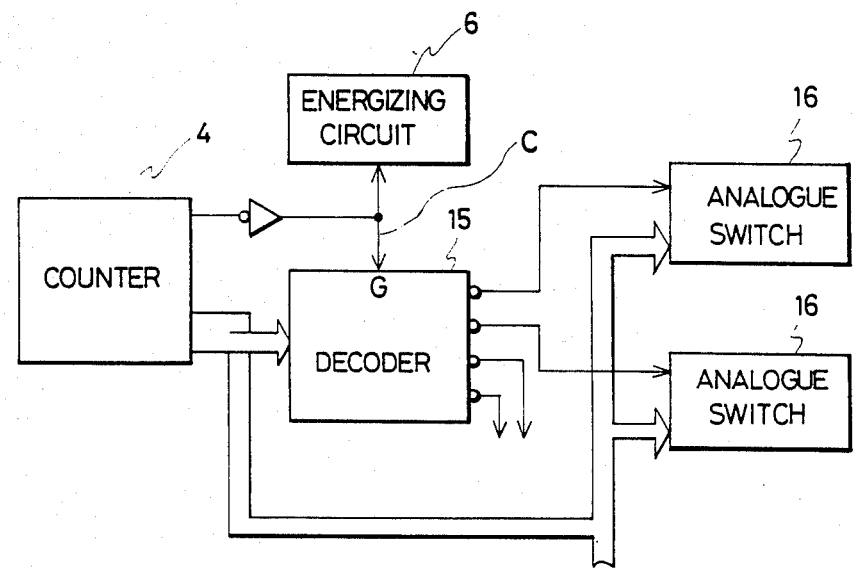
FIG. 2A is a detailed block diagram of a scanning circuit of the digitizer of FIG. 1.
Figure 2B:
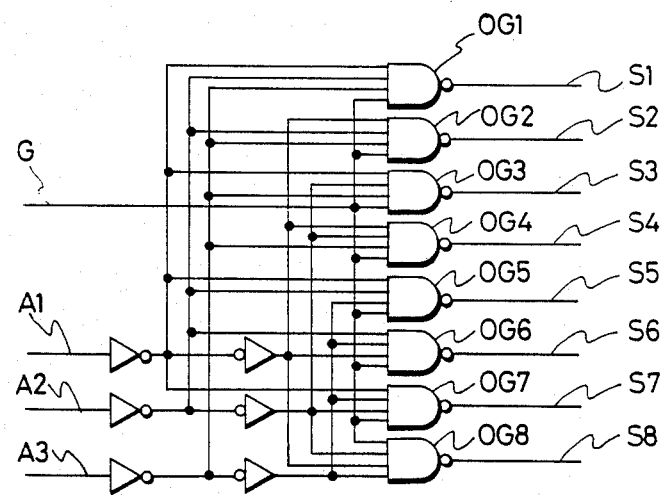
FIG. 2B is a detailed circuit of decoder of FIG. 2A.

FIG. 1 is a block diagram of digitizer of this invention and FIGS. 2A and 2B show a portion of block diagram of the digitizer and a decoder of FIG. 2A respectively.

FIG. 3 is a timing diagram showing the operation waveforms of the digitizer to explain the operation of the digitizer.

In FIG. 1, the digitizer is different from the conventional digitizer in the signal process circuit 10, X-scanning circuit 2 and Y-scanning circuit 3 but is the same as the conventional digitizer in the within block diagrams.

As shown in FIG. 2A, the X-scanning circuit 2 and Y-scanning circuit 3 are switch circuits composed of a decoder 15 and analogue switch 16.

The conductive line select address signal and gate signal c are outputted from the counter 4. The conductive line select address signal is applied to the decoder 15 to control the analogue switch, and the gate signal c is applied to the input terminal G and the energizing circuit 6.

The decoder 15 is a circuit as shown in FIG. 2B and has a signal line G for receiving the gate signal c, signal lines $A_1$–$A_3$ for receiving binary data of the conductive line select address a and output signal lines $S_1$–$S_8$ for selecting analogue switch.

When the conductive line select address signal is applied to the conductive line select address signal lines $A_1$–$A_3$, one of the output gates $OG_1$–$OG_8$ is selected. At this time, if the gate signal c is applied to the gate signal line G, an analogue switch select signal is produced from one of the output signal lines $S_1$–$S_4$, which corresponds to the conductive line select address.

The analogue switch select signal is not produced when the gate signal is not applied to the gate signal line G, even if the conductive line select address signal is applied to the conductive line select address signal lines $A_1-A_3$.

This decoder is embodied by using TTLIC SN74SI138. The concept of this decoder may be applied to a decoder having a number of conductive line select address signals and a number of analogue switches, although it has been described that in FIG. 2A, this decoder is the circuit for selecting one of 8 analogue switch select signal lines.

As described above, an additional circuit is not required by using the gate input terminal of the decoder IC, although the gate signal line is set newly in X-scanning circuit and Y-scanning circuit according to this embodiment.

Figure 4:
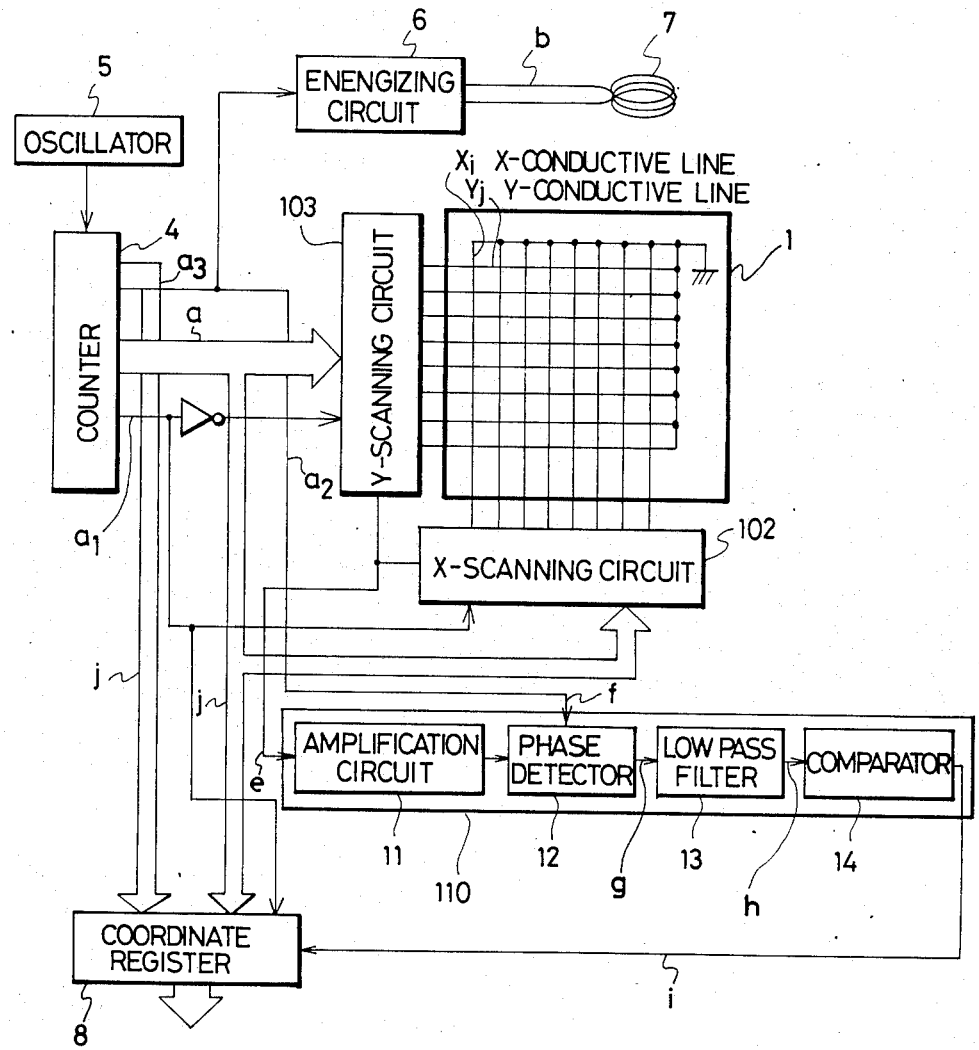
FIG. 4 is a block diagram of conventional digitizer.
Figure 5:
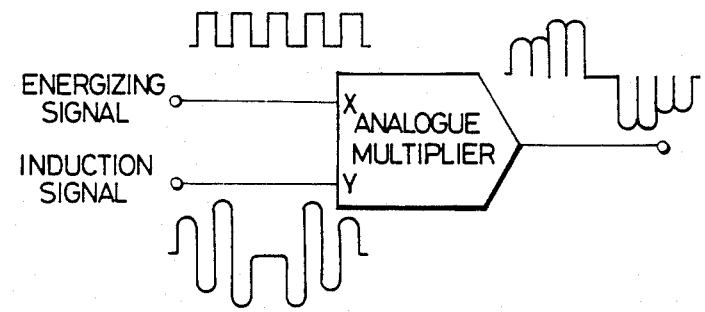
FIG. 5 is an embodiment of phase detector of conventional digitizer.
Figure 6:
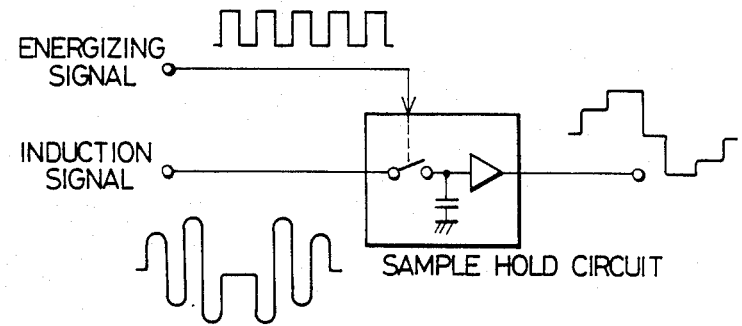
FIG. 6 is another embodiment of phase detector of conventional digitizer.

The gate signal c is equal to the reference signal f of the conventional digitizer as shown in FIG. 4 and the period of the gate signal is half that of the conductive line select address signal a.

The scanning circuit constructed as mentioned above is connected to the input terminal of the signal process circuit 10 and selects one of the conductors with the conductive line select address signal only while the gate signal is effective.

The signal process circuit 10 omits the phase detector from the conventional one of digitizer but the amplification circuit 11, the low pass filter 13 and the comparator 14 are the same as the conventional ones.

The signal process circuit receives the induction signal d and outputs the same as the conventional load signal i.

Next, the operation of digitizer according to this invention constructed as shown above will be described.

As shown in FIG. 3, the scanning circuit receives the conductive line select address signal a every certain period, the winding coil 7 receives the energizing signal b of ½ period of the conductive line select address signal a, and the conductive line produces the induction signal but the scanning circuit receives gate signal c in synchronism with the energizing signal b and provides the induction signal to the signal process circuit 10 only while the gate signal c is effective so that the induction signal represented by "d" is inputted to the signal process circuit 10.

Figure 7:
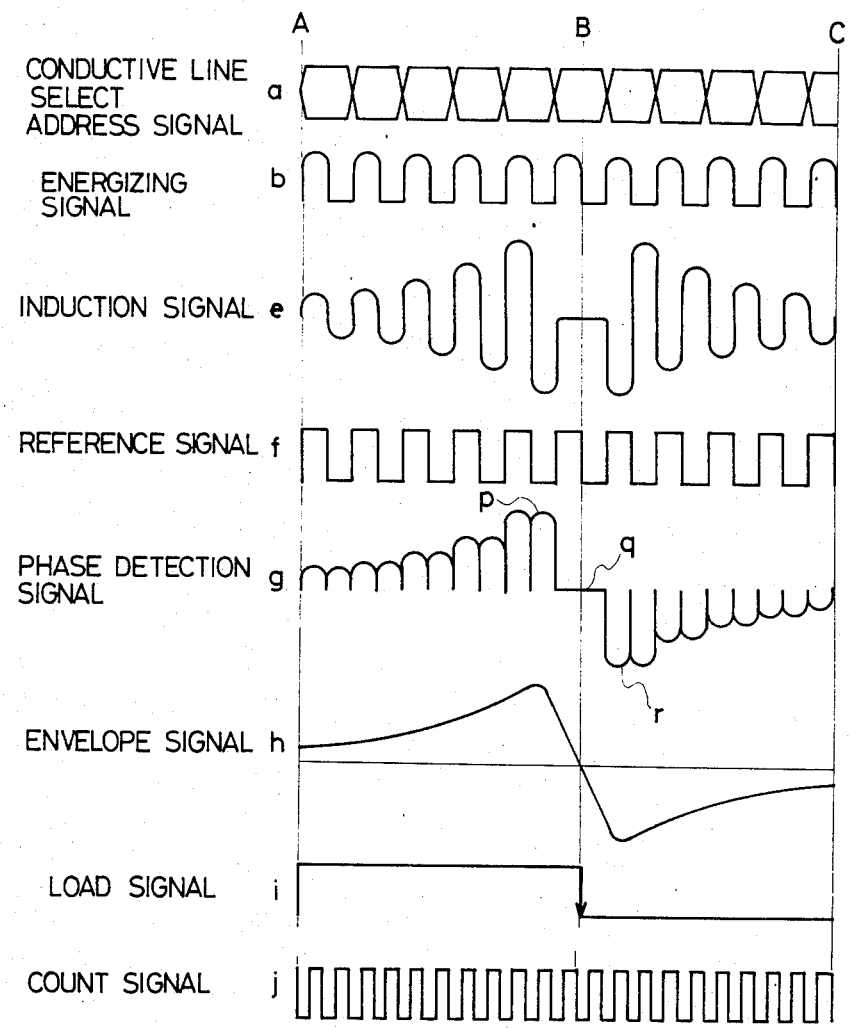
FIG. 7 is a timing diagram of the conventional digitizer.
Figure 8:
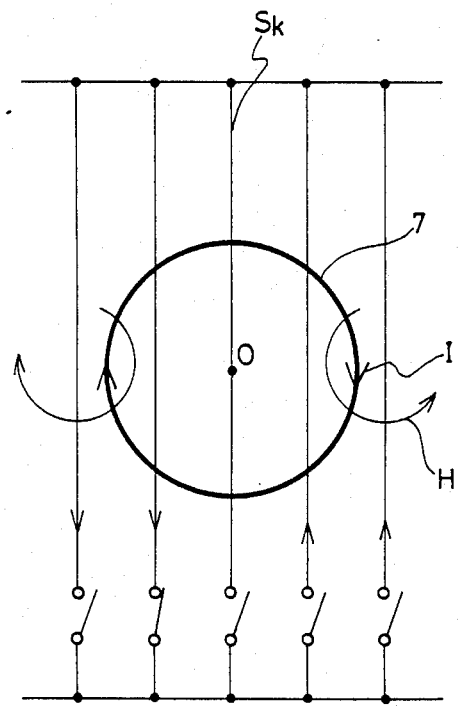
FIG. 8 is an explaining diagram for describing the relationship between a signal induced on conductive lines and the position of a winding coil.

This signal c is corresponding to the phase detection signal g of FIG. 7 in the conventional digitizer.

In prior art, the phase detection signal is made by the full-wave rectification of the induction signal of FIG. 7 whereas the induction signal d of FIG. 3 is relative to being the half-wave rectification of the induction signal of FIG. 7. It is understood that the induction signal holding phase relation relative to the energizing signal b is extracted.

Although the phase detector according to the conventional analogue multiplication has used both polarity components of the induction signal, the energizing signal b is asymmetric and the induction signal does not become almost symmetric in both polarities.

The induction signal d obtained by a method according to this invention is convenient to obtain envelope line required in the induction signal than that obtained by the conventional method.

The induction signal d is amplified to a predetermined amplitude, is converted into the envelope signal h by the low pass filter 13 and thereafter the comparator detects the polarity inversion point to produce the load signal i.

It is apparent that the digitizer is constructed in the same as the conventional manner from the above description, although the method to solve the coordinate is the same as the conventional one.

As mentioned above, the digitizer according to this invention is possible to omit the phase detector since its scanning circuits have gate function including the same function as the conventional phase detector and to manufacture the digitizer with simpler circuit construction than the conventional one.

What is claimed is:

1. A digitizer using phase inversion detection system comprising:
   a winding coil for generating magnetic field to indicate coordinate in response to an energizing signal,
   a tablet having a plurality of conductive lines arranged in parallel with each other,
   detection means for detecting phase inversion of an induction signal induced on said conductive lines,
   counting means for measuring time interval between a starting time of selecting one of said conductive lines and a detecting time of phase inversion,
   a scanning circuit for selecting one of said conductive lines in turn, said scanning circuit receiving a gate signal from said counting means at an input terminal thereof in synchronism with said energizing signal and including circuit means for selecting said one of conductive lines during existence of said gate signal, and
   coordinate storing means for holding coordinate value.

2. A dititizer as claimed in claim 1, and further comprising analogue switch means connected to said circuit means.

3. A digitizer as claimed in claim 1 wherein said detecting means comprises an amplification circuit for amplifying said induction signal, a low pass filter for producing an envelope signal and a comparator for producing a load signal.

* * * * *